United States Patent Office.

WILLIAM WHEELER HUBBELL, OF PHILADELPHIA, PENNSYLVANIA.

Letters Patent No. 89,579, dated May 4, 1869.

IMPROVED FLUX FOR EXTRACTING PRECIOUS METALS FROM THEIR ORES.

The Schedule referred to in these Letters Patent and making part of the same.

Be it known that I, WILLIAM WHEELER HUBBELL, of the city of Philadelphia, State of Pennsylvania, have invented or discovered a new and useful Improvement in the Method of Extracting Precious Metals from their Ores; and that the following is a full, clear, and exact description thereof.

The nature of my invention consists in providing the furnace with sulphate of baryta, commonly known as heavy quartz, to form a flux of sufficient weight to float the matrix or earthy matter of the gold and silver-quartz, and separate the metals from them, and retain the sulphur on the top of or above the flux, and consuming it readily, by first pulverizing or cracking into lumps the quartz of gold or silver, and afterward supplying it to the furnace in this cracked or pulverized condition.

The flux quartz or sulphate of baryta, must also be cracked up fine in lumps, or pulverized, and in this state be supplied to the furnace, so as to readily fuse and carry the gold and silver down with it.

The specific gravity of this sulphate of baryta amongst quartz, is so much greater than that of any other kind of quartz, that it will rest at the bottom of all the earthy matter as a flux, and all of the metals will settle through and below it in the order of their relative specific gravities. I apply it also to copper-ores.

In my patent No. 65,387, dated June 4, 1857, for improved mode of desulphurizing ores and extracting gold and silver, I have stated that "in case a furnace is employed to smelt the ore, the ore first pulverized and saturated with the saltpetre alone, or with the powdered charcoal included, may be thrown into a charcoal fire in the furnace, and thus desiccated and set free, or smelted with any suitable flux."

This present invention is an improvement upon this method, by the application and use of sulphate of baryta to form the flux, and when this quartz or material is used for the flux, the saltpetre, if not cheap and convenient, or if desired, may be omitted, and the gold and silver-ore, in a pulverized, cracked, or other condition, be applied to the furnace; the fire will then free the metals from the pulverized quartz and sulphur in them, by evaporating the sulphur and melting it, and also the gold and silver, and other metals, and the flux formed by the sulphate of baryta is so very heavy as to separate and float the sulphur; the gold will sink to the bottom; next above it the silver will collect; the lead will burn up, or at least most of it, while the precious metals descend through the flux, and whatever metals may be in the ore, will settle according to their relative specific gravities.

The bottom of the furnace is made conical or chambered, to receive them, and provided with apertures, from which to draw them off respectively as desired, while the furnace is in blast. A strong draught must be used.

What I claim as my invention, and desire to secure by Letters Patent, is—

The use and application of sulphate of baryta to a furnace to form a flux, with which to separate the metals of gold or silver-ores from the other quartz or earthy matter and sulphur in them, substantially as described.

WM. W. HUBBELL.

Witnesses:
E. A. RAMLEY,
JOHN WHITE.